No. 711,794. Patented Oct. 21, 1902.
C. STEIN.
ICE SAW.
(Application filed Jan. 8, 1902.)
(No Model.)
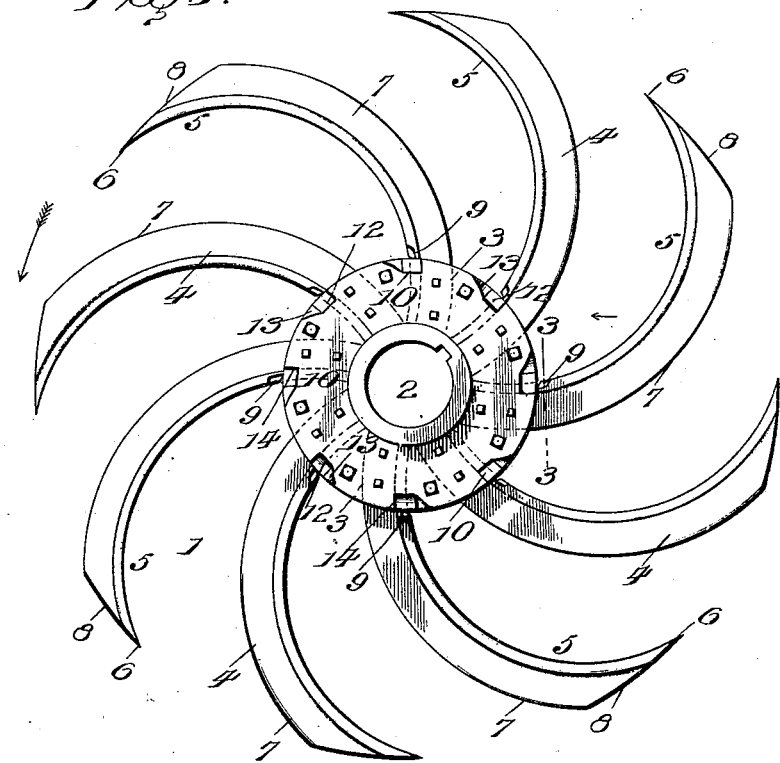
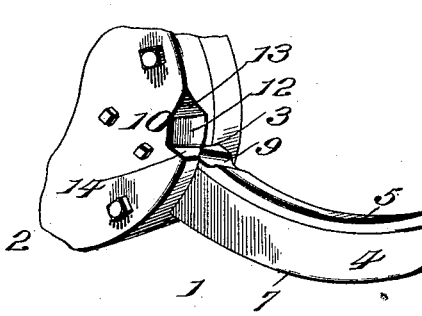
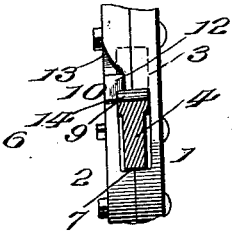
Inventor
Calvin Stein.
Witnesses
By
Attorney.

UNITED STATES PATENT OFFICE.

CALVIN STEIN, OF NILES, OHIO.

ICE-SAW.

SPECIFICATION forming part of Letters Patent No. 711,794, dated October 21, 1902.

Application filed January 8, 1902. Serial No. 88,844. (No model.)

*To all whom it may concern:*

Be it known that I, CALVIN STEIN, of Niles, in the county of Trumbull and State of Ohio, have invented certain new and useful Improvements in Ice-Saws; and I do hereby declare the following to be a full, clear, and exact description of the invention, such as will enable others skilled in the art to which it appertains to make and use the same.

In the use of ice-saws as heretofore constructed it has been found that the shavings or ice-sawdust collect between the teeth of the saw and becoming tightly packed will congeal and render the operation of the machine ineffective. Then, too, such portion of the shavings as does slip off the teeth is apt to fall into the cut in the ice-field just made by the saw and clog the opening, where it quickly congeals, thus necessitating further cutting before the blocks of ice can be separated.

The object of my invention is to provide simple and highly-efficient means by which the shavings may be guided off the teeth and out of the path of the saw.

A further object is to provide an improved tooth or blade for ice-saws.

The invention will be hereinafter fully set forth, and particularly pointed out in the claims.

In the accompanying drawings, Figure 1 is a view in side elevation of a saw constructed in accordance with my invention. Fig. 2 is a detail. Fig. 3 is a cross-section on line 3 3, Fig. 1.

Referring to the drawings, 1 designates a saw designed for use in ice-harvesters. The hub 2 is formed with a series of sockets 3, in which fit blades 4. Each of these blades is curved longitudinally, the respective cutting edges 5 terminating in a point 6, while the rear edge 7 is also curved to near its outer end, whence it is formed with a flattened portion 8 about at right angles to the base of the blade. The cutting edges are sufficiently broad to insure a wide groove being made in the ice and also to hold the shavings thereon. Each of the blades near the point of union with the hub is formed with an obliquely-extended cut-out 9, the inner end of which terminates within the periphery of the hub. The latter at points in line with the cut-out of the several blades is equipped with guides, shown in the form of a series of cut-outs 10, having two beveled walls 12 and 13 and a perpendicular wall 14, each of the cut-outs 10 being designed to register with the cut-out 9 of the adjacent blade.

In practice the saw is rotated in the direction of the arrow, Fig. 1. The blades upon penetrating the ice operate like a plow-point, the described formation of their edges insuring a positive action without causing undue strain. As the shavings are caught on the wide cutting edges of the blades the rotary movement of the latter causes them to slide along such edge until they reach the cut-outs 9, whence they will be guided or deflected into the cut-out 10 in the hub and by the beveled walls 12 and 13 thereof turned to the side and out of the path of the saw. It will be noted that these beveled walls and the straight wall 14 will cause the shavings to fall only away from the succeeding blade.

While I have shown and described a saw having blades removably secured to the hub, yet it is obvious that the entire saw may be made of one solid piece of metal or wood cut out as herein described.

The advantages of my invention are apparent to those skilled in the art.

I claim as my invention—

1. The herein-described ice-saw comprising a hub having guides, a series of blades secured to said hub, said blades being curved longitudinally in the direction of rotation and formed with a flattened portion at their outer ends, and having a broad cutting edge, and deflecting means on said blades designed to register with said guides, as and for the purpose set forth.

2. The herein-described ice-saw comprising a hub having sockets, curved blades designed to be held in said sockets and having each a broad cutting edge, a cut-out being formed in said blades, and a guide on said hub with which said cut-out registers, substantially as and for the purpose set forth.

3. In an ice-saw, the combination with the hub having sockets and cut-outs in its periphery, each of the latter being formed with two beveled walls and one straight wall, of curved blades held in said sockets and having a cutting edge, cut-outs being formed diagonally in the cutting edges of the blades, and registering with the cut-outs in the hub, substantially as and for the purpose set forth.

In testimony whereof I have signed this specification in the presence of two subscribing witnesses.

CALVIN STEIN.

Witnesses:
PAUL STEIN,
JEAN KILPATRIC.